Aug. 14, 1945.   F. J. HANAK   2,382,147
COMBINED EYE SHIELD AND GUARD
Filed Nov. 21, 1944    2 Sheets-Sheet 1
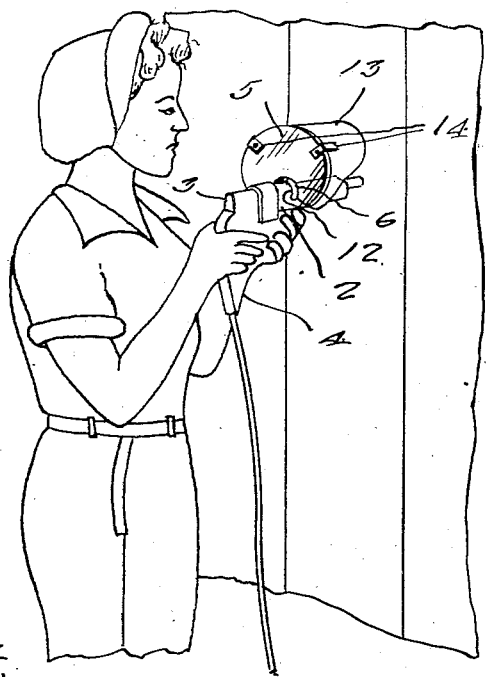
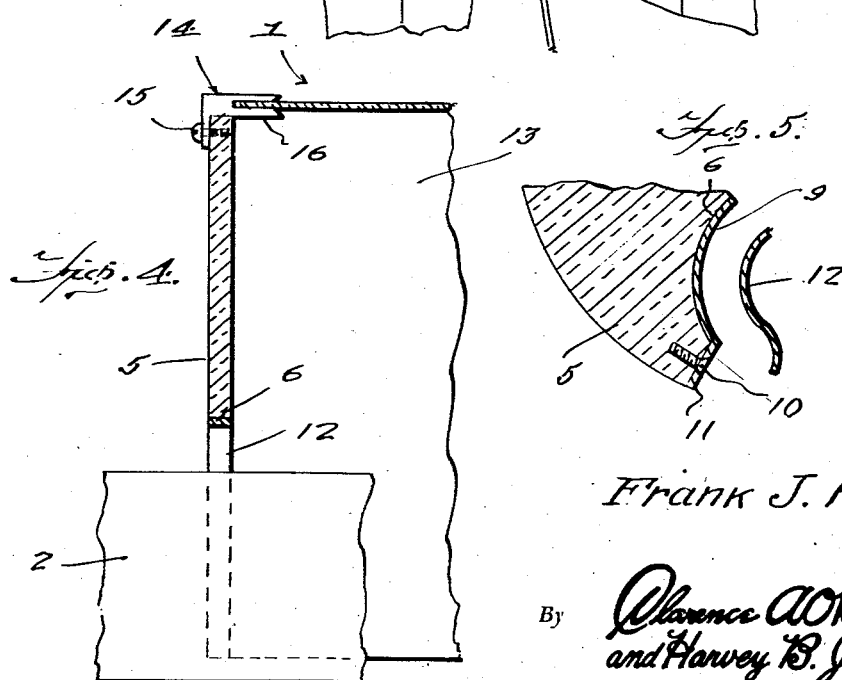
Inventor
Frank J. Hanak
By Clarence A. O'Brien
and Harvey B. Jacobson
Attorneys Aug. 14, 1945.   F. J. HANAK   2,382,147
COMBINED EYE SHIELD AND GUARD
Filed Nov. 21, 1944   2 Sheets-Sheet 2
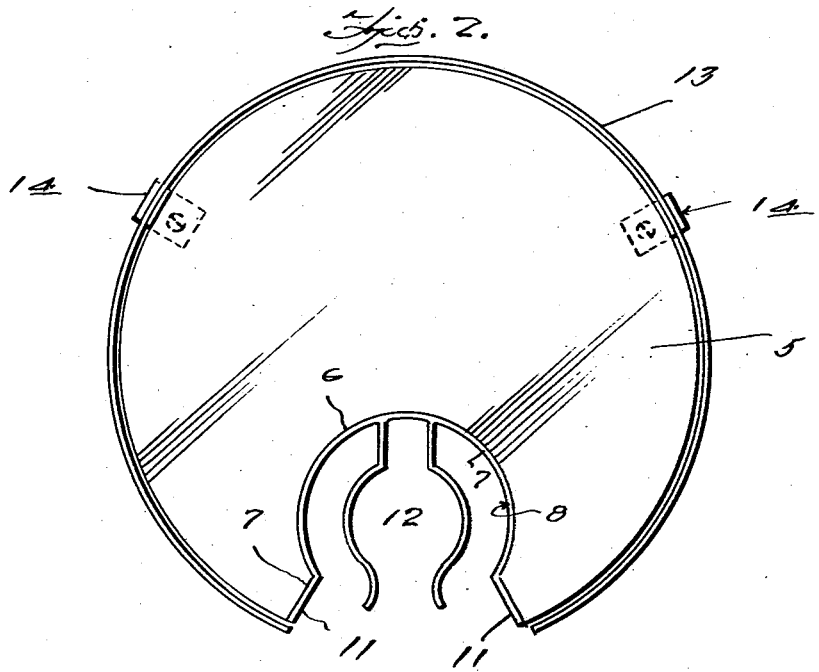
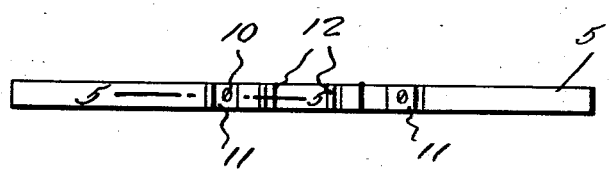
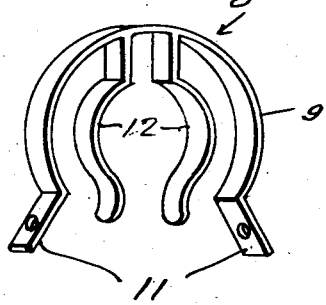
Inventor
Frank J. Hanak Patented Aug. 14, 1945

2,382,147

UNITED STATES PATENT OFFICE 2,382,147

COMBINED EYE SHIELD AND GUARD

Frank J. Hanak, Toledo, Ohio, assignor of fifty per cent to John Stelnicki, Toledo, Ohio Application November 21, 1944, Serial No 564,455

4 Claims. (Cl. 78—46)

My invention relates to improvements in combined eye shields and guards for use on percussion and other implements, and more particularly on pneumatic hand riveters.

By way of explanation, in using such implements as hand riveters, particularly in the aircraft industry and in operating on aluminum, the operator is obliged to wear goggles, or a face shield, to protect the eyes from glare and sparks, and the eyes and face from flying particles of the metal. The glare against which protection is sought results from the use, principally, at night, of high-powered illuminating lights in aircraft plants, and also from sparks frequently occurring in riveting. Such devices, besides discomfort, cause perspiration, and flying particles of metal frequently find their way past the goggles and shield and together with perspiration cause face rashes and infections, frequently infectious. Operators often obtain shields or goggles previously worn by others and become infected from the same.

With the foregoing in mind, it is the primary object of my invention to provide a simply constructed, inexpensive, combined eye shield and guard adapted for easy, quick attachment to such implements as hand riveters to positively protect the eyes against glare and sparks and flying particles of metal, also the face, and by virtue of which the wearing of goggles and face shields, or masks, is rendered unnecessary.

Other and subordinate objects are also comprehended by my invention, all of which, together with the precise nature of my improvements, will be readily understood when the succeeding description and claims are read with reference to the drawings accompanying and forming part of this specification.

In said drawings:

Figure 1 is a view in perspective of my improved combined eye shield and guard, in its preferred embodiment, applied to a pneumatic hand riveter, Figure 2 is a view in end elevation looking at the front end of the same, and drawn to an enlarged scale, the combined eye shield and guard being detached, Figure 3 is a view in edge elevation of the rear shield plate, Figure 4 is a view in vertical longitudinal section of the rear portion of the combined eye shield and guard, Figure 5 is a detail view in section taken on the line 5—5 of Figure 3, and drawn to an enlarged scale, Figure 6 is a view in perspective of the combined support and attaching member detached.

Referring to the drawings by numerals, according to my invention, as illustrated, a combined eye shield and guard of hood-like form, and designated generally by the numeral 1, is provided for attachment to the barrel part 2 of a pneumatic hand riveter 3 of the pistol grip type, said shield and guard overlying said barrel forwardly of the pistol grip 4 for a suitable distance.

The combined eye shield and guard 1 comprises a rear shield plate 5 of suitable transparent material such as glass and which, preferably, with the exception presently noted, is of circular form. The shield plate 5 is provided with a bottom notch 6 which is, generally, of arcuate form with flaring side portions 7 at the mouth of the notch.

A combined support and attaching member 8 of resilient flat metal is fitted in the notch 6, said member having an outer frame 9 adapted to conform in shape to that of the notch 6 and to fit therein. Screws 10 extending through the ends 11 of said frame 9 and into the walls 7 of the notch 6 secure said member in said notch. A pair of opposed, resilient clips 12 extend from the frame 8 inwardly thereof and upon opposite sides of what constitutes the vertical center of the notch 6 and shield plate 5. The clips 12 are opposite bowed to fit with a snap action over and part way around the barrel 2 of the riveter 3 to support the plate 5 on said barrel and provide a clearance between said barrel and the frame 9 of said member.

A hood 13, also of suitable transparent material and which is of arcuate form in cross section, with open front and rear ends, is detachably attached to the shield plate 5, at what constitutes its rear end, to overlie the barrel 2 forwardly of said plate 5 and partially surround said barrel. The hood 13, as will be understood, is open at its bottom to straddle said barrel 2 and the rear end of said hood is of the proper size to surround the outer edge of the shield plate 5.

For attaching the described hood 13 to the shield plate 5, a pair of right angled clips 14 of any suitable material are attached at one end thereof, as by screws 15, to said plate at opposite sides of the latter and which comprise forwardly extending split, resilient ends 16 straddling the rear edge portion of the hood 13, as best shown in Figure 4.

As will be obvious, the described shield and guard provides for clear vision, through the shield plate 5 and hood 13, for inspection of the work being done, while, at the same time, flying particles and sparks are trapped in the hood and prevented from reaching the operator. Also, both the shield plate and hood shield the eyes from glare, it being understood that said plate and shield may be of suitably tinted glass or other transparent material for preventing glare. As will further be seen, by virtue of the clips 12, the device may be shoved along the barrel 2 of the riveter 3 for location thereon as desired and may be easily and quickly attached to or detached from said barrel. The hood 13 may be detached easily from the shield plate 5 for replacement, cleaning, or other purposes.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claims.

What I claim is:

1. A combined eye shield and guard for attachment to an implement comprising a transparent hood of substantially arcuate form in cross section for straddling the implement in partially surrounding and overlying relation thereto, said hood having open ends, a transparent closure plate for one end of the hood provided with a bottom edge notch for straddling the implement, means in said notch for attaching the closure plate to said implement, and means to attach said one end of the hood to the closure plate.

2. A combined eye shield and guard for attachment to an implement comprising a transparent hood of substantially arcuate form in cross section for straddling the implement in partially surrounding and overlying relation thereto, said hood having open ends, a transparent closure plate for one end of the hood provided with a bottom edge notch for straddling the implement, means in said notch for attaching the closure plate to said implement, said means comprising resilient clips, and means to attach said one end of the hood to the closure plate.

3. A combined eye shield and guard for attachment to an implement comprising a transparent hood of substantially arcuate form in cross section for straddling the implement in partially surrounding and overlying relation thereto, said hood having open ends, a transparent closure plate for one end of the hood provided with a bottom edge notch for straddling the implement, and means in said notch for attaching the closure plate to said implement, said hood being detachably attached to said end closure plate.

4. A combined eye shield and guard for attachment to an implement comprising a transparent hood of substantially arcuate form in cross section for straddling the implement in partially surrounding and overlying relation thereto, said hood having open ends, a transparent closure plate for one end of the hood provided with a bottom edge notch for straddling the implement, means in said notch for attaching the closure plate to said implement comprising a frame fitted in said notch and secured to the sides of the same, and a pair of clips in said frame for engaging said implement with a snap action, and means to attach said one end of the hood to the closure plate.

FRANK J. HANAK.